United States Patent
Lin et al.

(10) Patent No.: US 8,648,810 B2
(45) Date of Patent: Feb. 11, 2014

(54) INTEGRATED INPUT APPARATUS

(75) Inventors: Yi-Hung Lin, Zhonghe (TW);
Chih-Yung Chen, Zhonghe (TW);
Yu-Kai Lin, Zhonghe (TW)

(73) Assignee: Ko Ja (Cayman) Co., Ltd., New Taipei (TW)

( * ) Notice: Subject to any disclaimer, the term of this patent is extended or adjusted under 35 U.S.C. 154(b) by 306 days.

(21) Appl. No.: 13/026,361

(22) Filed: Feb. 14, 2011

(65) Prior Publication Data

US 2012/0206354 A1   Aug. 16, 2012

(51) Int. Cl.
*G06F 3/02*   (2006.01)
*G06F 3/041*   (2006.01)

(52) U.S. Cl.
USPC .................... 345/168; 345/173; 345/102

(58) Field of Classification Search
USPC ................... 345/168–174, 102, 160; 341/22; 178/18.01–19.01
See application file for complete search history.

(56) References Cited

U.S. PATENT DOCUMENTS

| | | | |
|---|---|---|---|
| 6,179,432 B1* | 1/2001 | Zhang et al. | 362/84 |
| 6,765,503 B1* | 7/2004 | Chan et al. | 341/22 |
| 6,943,705 B1* | 9/2005 | Bolender et al. | 341/33 |
| 6,987,466 B1* | 1/2006 | Welch et al. | 341/22 |
| 2001/0013861 A1* | 8/2001 | Shimizu | 345/173 |
| 2004/0174331 A1* | 9/2004 | Su et al. | 345/102 |
| 2009/0109068 A1* | 4/2009 | Yeh et al. | 341/34 |
| 2009/0167690 A1* | 7/2009 | Wang et al. | 345/168 |
| 2010/0321298 A1* | 12/2010 | Tsai et al. | 345/168 |
| 2011/0298717 A1* | 12/2011 | Liu | 345/168 |
| 2012/0092259 A1* | 4/2012 | Liu et al. | 345/168 |

* cited by examiner

*Primary Examiner* — Hong Zhou
(74) *Attorney, Agent, or Firm* — Chun-Ming Shih; HDLS IPR Services

(57) ABSTRACT

An integrated input apparatus includes a panel, a sensing layer, a backlight layer, and a bottom layer. The panel includes a plurality of hot key patterns, a typing key group pattern, a cursor control pattern, and a response key pattern (a left key and a right key). When anyone of the hot key patterns, the typing key group pattern, the cursor control pattern, or the response key pattern is touched, a sensing control signal is sensed by the sensing layer and sent to a computer host for further processing.

14 Claims, 9 Drawing Sheets

INTEGRATED INPUT APPARATUS

BACKGROUND OF THE INVENTION

1. Field of the Invention

The present invention relates to a keyboard and in particular to a touchpad keyboard structure.

2. Description of Prior Art

A keyboard is one of the indispensable peripheral accessories for a desktop computer or a notebook computer. It is used to input operating commands to execute a specific function by a user.

Except a touchpad (control cursor motions) on a keyboard used in a desktop computer or a notebook computer, other function keys, typing key group, and hot keys are designed with mechanical-pressing structures. For example, a typing key has a keycap. After the keycap is pressed, the structure inside the keycap will press a rubber elastic layer to press a film type PCB or a hard PCB to generate operation signals to input to a computer host.

Manufacturing the keyboard with the touchpad (control cursor motions), the function keys, the typing key group, and the hot keys is inconvenience because the manufacturing process of the touchpad is separated from the function keys, the typing key group, and the hot keys.

Moreover, the function keys, the typing key group, and the hot keys on the keyboard are mechanism design. When the keycaps are pressed by a user's fingers, it will easily result noise. Moreover, when the keycaps are pressed by a user's fingers, the press force will cause the structures of the pressed keys damage, so that the pressed keys can't be pressed to generate operation signals. It's inconvenience for the user when using.

SUMMARY OF THE INVENTION

In order to solve the above-mentioned problems, the main object of the present invention is to provide an integrated input apparatus. Besides the touchpad (control cursor motions) on the keyboard, other function keys, typing key group, and hot keys on the keyboard are designed as touchpad type as well. It will reduce noise when using the keyboard. The touchpad, the function keys, the typing key group, and the hot keys are manufactured simultaneously. This will save the manufacturing time, process and cost when manufacturing keyboards.

In order to achieve the object mentioned above, the present invention provides an integrated input apparatus. The integrated input apparatus includes a panel, a sensing layer, a backlight layer, and a bottom layer. The panel includes a first surface and a second surface. The first surface includes a plurality of hot key patterns, a typing key group pattern, a cursor control pattern, and a response key pattern.

The sensing layer is disposed under the panel. The sensing layer includes a first transparent layer and a second transparent layer. The first transparent layer includes a first front surface and a first back surface. The first back surface includes a plurality of first sensing blocks, a plurality of first electrode blocks, a second sensing block, and a third electrode block. The first sensing blocks are disposed against the hot key patterns. The first sensing blocks are electrically connected to a plurality of transmission wires. The first electrode blocks are electrically connected to each other and are connected to a plurality of transmission wires. The first electrode blocks are disposed against the response key pattern. The second sensing block is disposed against the cursor control pattern. The third electrode block is electrically connected to the first electrode blocks. The third electrode block is disposed against the response key pattern (a left key and a right key).

Besides, the second transparent layer includes a second front surface and a second back surface. The second front surface includes a plurality of second electrode blocks. The second electrode blocks are electrically connected to each other and are connected to a plurality of transmission wires. The second electrode blocks are disposed against the first electrode blocks and the third electrode block. Convex bodies are disposed around the second electrode blocks. A gap space is formed between the first electrode blocks, the third electrode block, and the second electrode blocks with the convex bodies.

The backlight layer is disposed under the sensing layer. The backlight layer includes a first surface and a second surface. The first surface includes a plurality of first light emission elements against the first sensing blocks. A power transmission wire is electrically connected to each of the first light emission elements. The second surface includes a plurality of second light emission elements against the first electrode blocks and the second electrode blocks. The second light emission elements are electrically connected to each other and are connected to power transmission wires. The bottom layer bears the assemblies of the panel, the sensing layer, and the backlight layer.

DETAILED DESCRIPTION OF THE INVENTION

Figure 1:
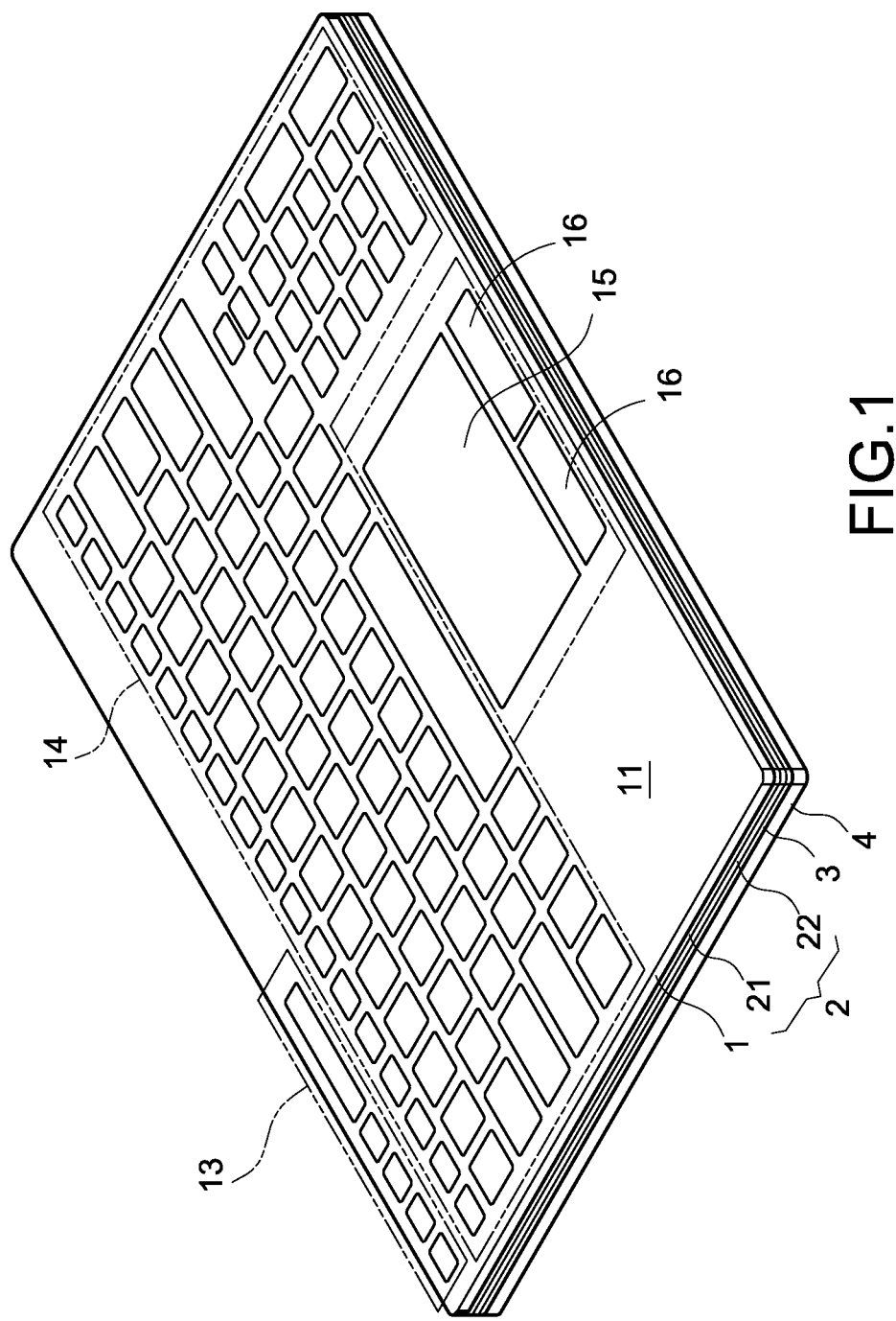
FIG. 1 shows a perspective view of touchpad type keyboard structure of the present invention.
Figure 2:
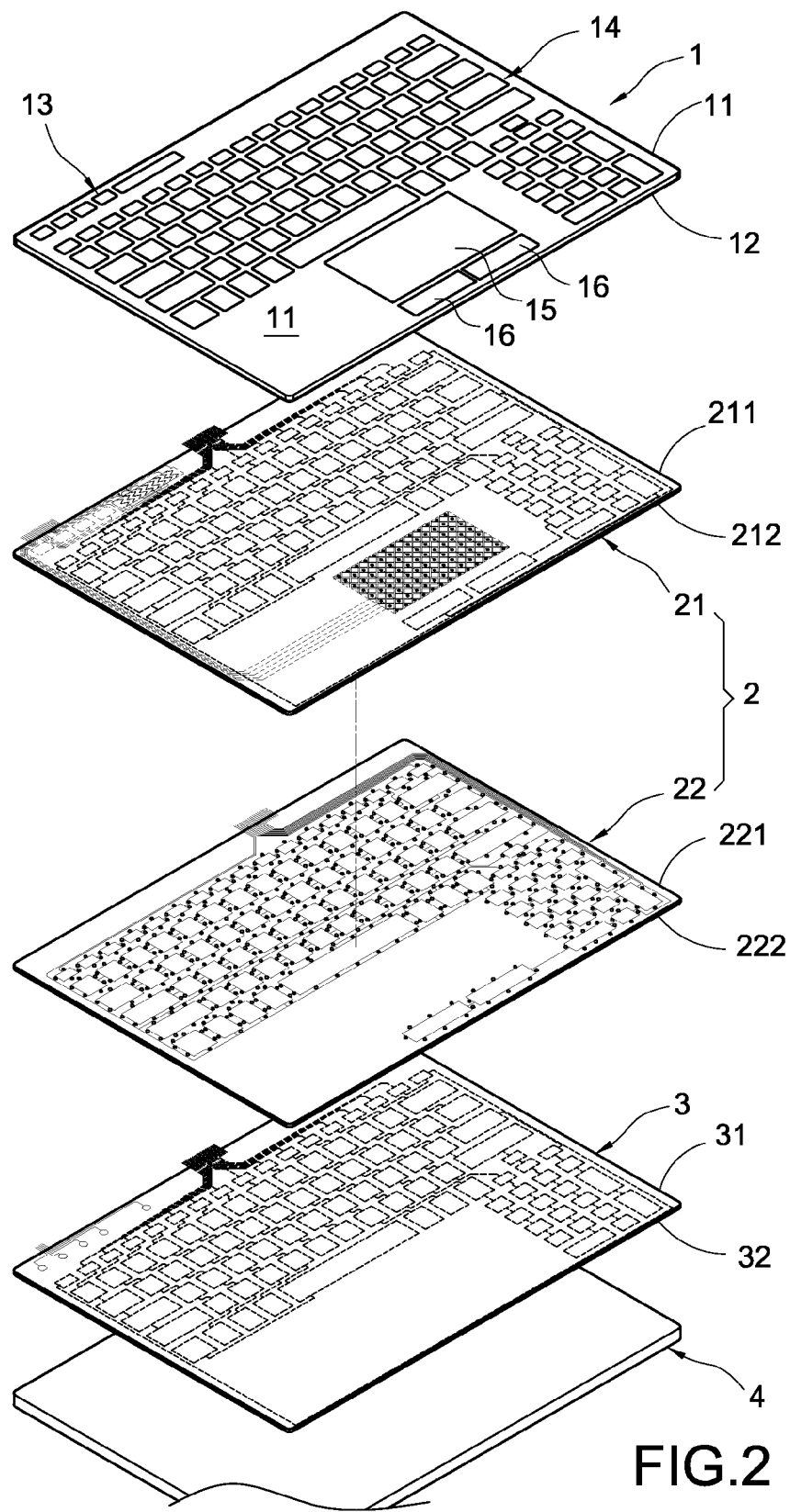
FIG. 2 shows an exploded view of touchpad type keyboard structure of the present invention.
Figure 3:
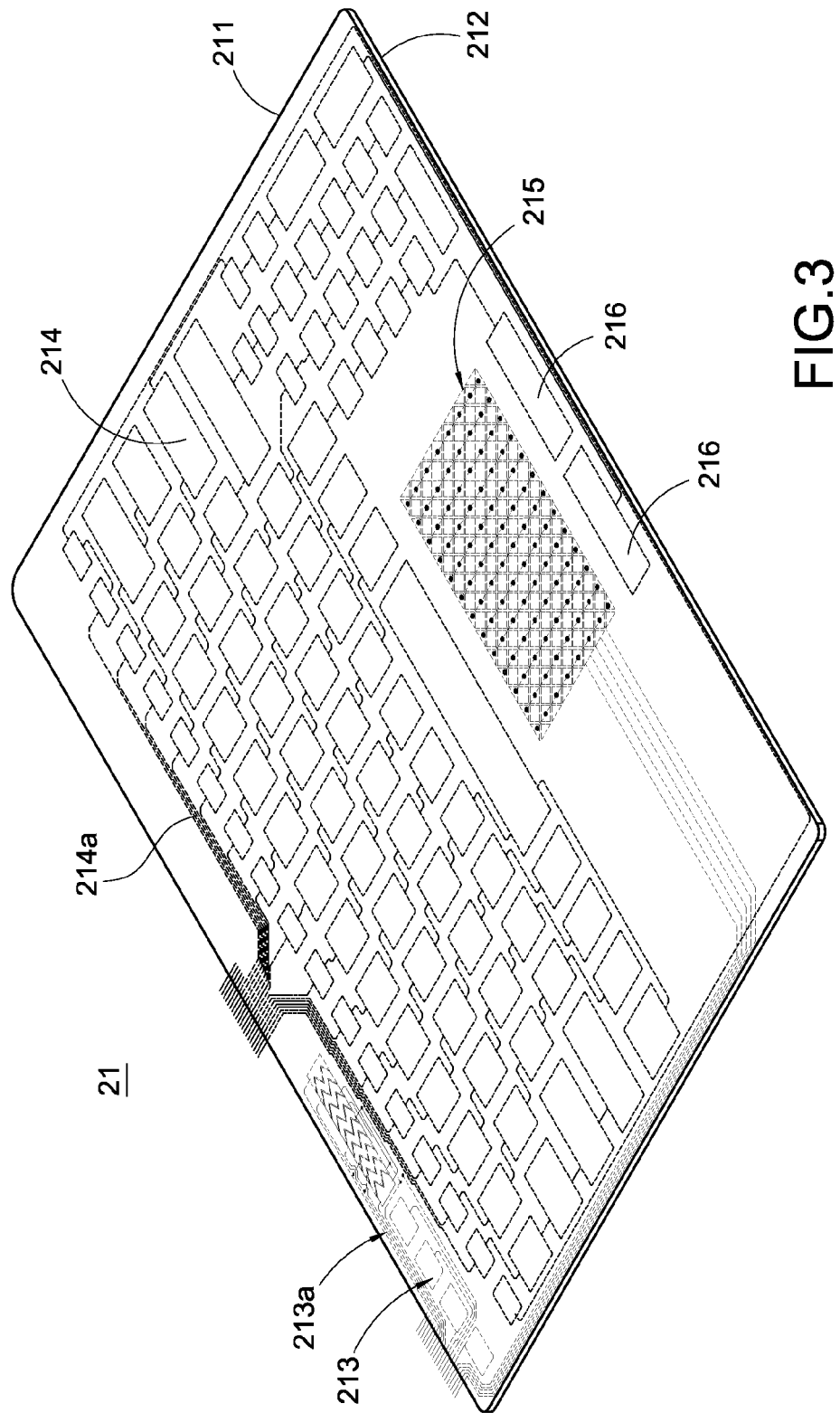
FIG. 3 shows an enlarged view of first transparent layer of sensing layer in FIG. 2.
Figure 4:
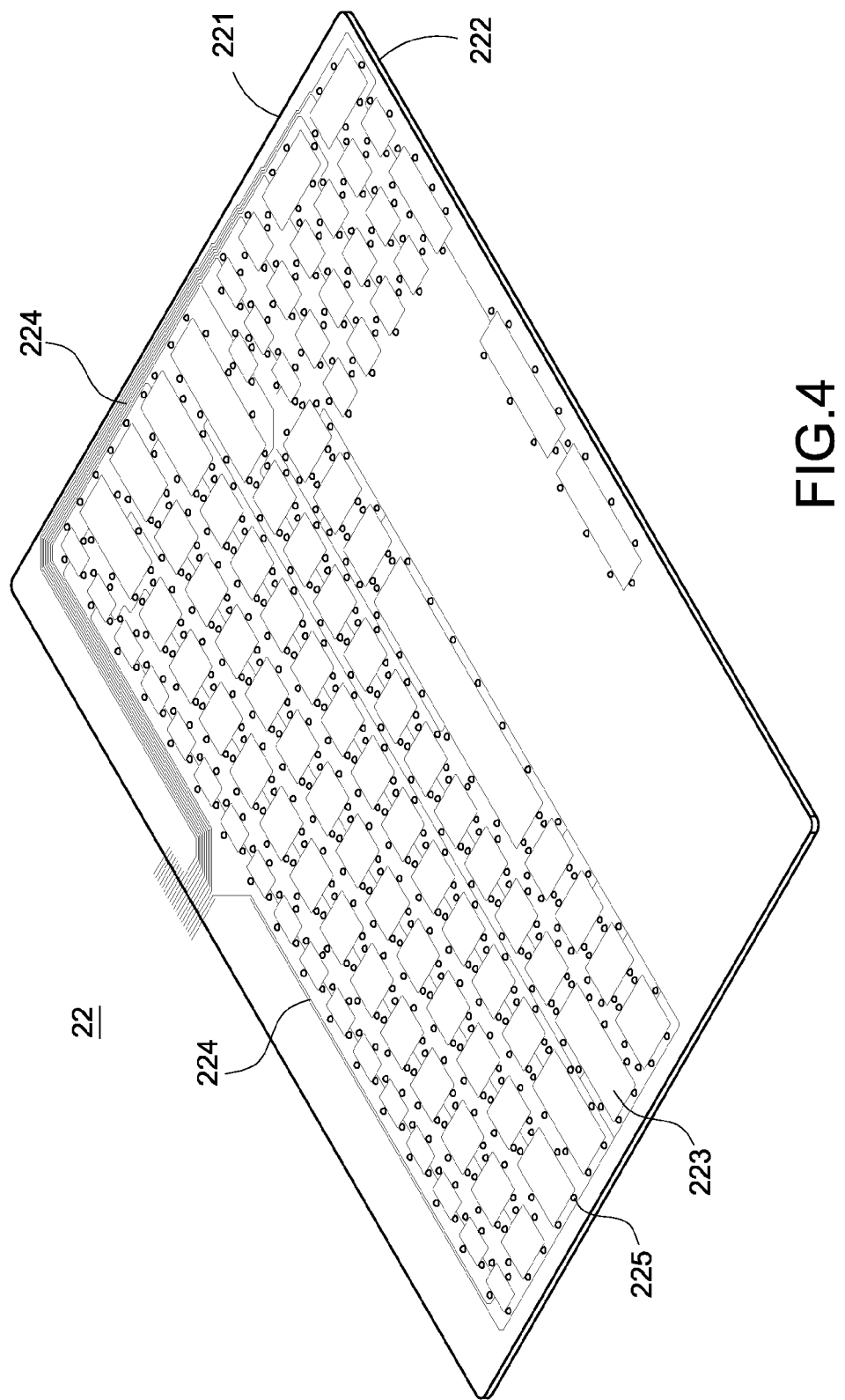
FIG. 4 shows an enlarged view of second transparent layer of sensing layer in FIG. 2.
Figure 5:
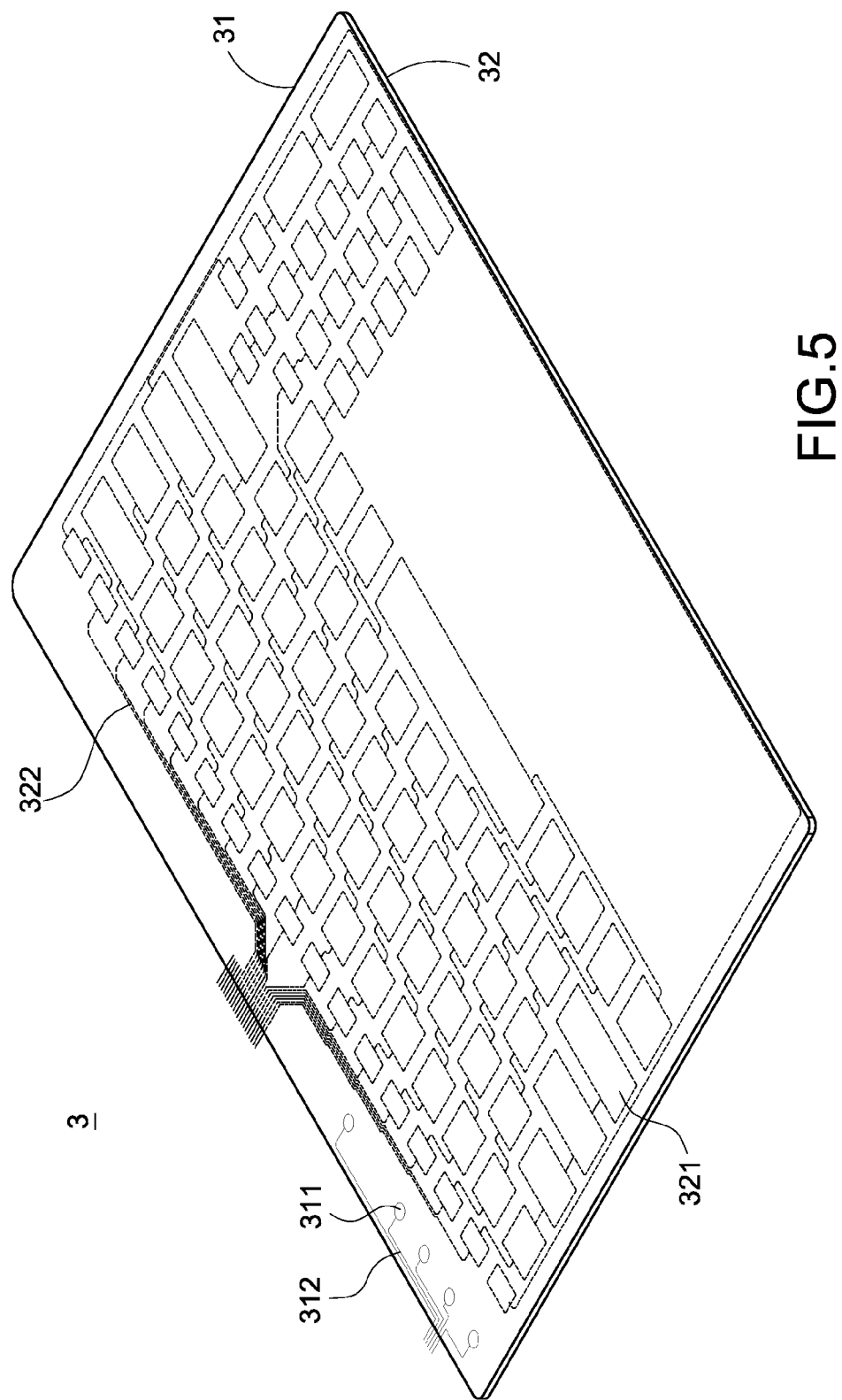
FIG. 5 shows an enlarged view of backlight layer in FIG. 2.

Reference will now be made to the drawing figures to describe the present invention in detail. FIG. 1 shows a perspective view of touchpad type keyboard structure of the present invention. FIG. 2 shows an exploded view of touchpad type keyboard structure of the present invention. FIG. 3 shows an enlarged view of first transparent layer of sensing layer in FIG. 2. FIG. 4 shows an enlarged view of second transparent layer of sensing layer in FIG. 2. FIG. 5 shows an enlarged view of backlight layer in FIG. 2. As shown in these drawings, an integrated input apparatus of the present invention includes a panel 1, a sensing layer 2, a backlight layer 3, and a bottom layer 4.

The panel 1 is a transparent plastic slice with a first surface 11 and a second surface 12. The first surface 11 includes a plurality of hot key patterns 13, a typing key group pattern 14, a cursor control pattern 15, and a response key pattern 16 (a left key and a right key). The hot key pattern 13 is touched by a user to execute a specific function. For example, a computer is connected to the internet as long as a user presses the hot key pattern 13 for surfing the internet. The typing key group pattern 14 is used to input operating commands by a user, for example various symbols, letters, numbers, typeface capital letter or lowercase letter, and functions switch, etc. The cursor control pattern 15 is used to control the mouse cursor by a user. The response key pattern 16 is used to click and confirm etc. by a user.

The sensing layer 2 is disposed under the panel 1. The sensing layer 2 includes a first transparent layer 21 made of a transparent plastic slice and a second transparent layer 22 made of a transparent plastic slice. The first transparent layer 21 includes a first front surface 211 and a first back surface 212. The first back surface 212 includes a plurality of first sensing blocks 213, a plurality of first electrode blocks 214, a second sensing block 215, and a third electrode block 216. The first sensing blocks 213 are disposed against the hot key patterns 13. The first sensing blocks 213 are electrically connected to a plurality of transmission wires 213a. The first electrode blocks 214 are electrically connected to each other and are connected to a plurality of transmission wires 214a. The first electrode blocks 214 are disposed against the response key pattern 14. The second sensing block 215 is disposed against the cursor control pattern 15. The third electrode block 216 is electrically connected to the first electrode blocks 214. The third electrode block 216 is disposed against the response key pattern 16.

Besides, the second transparent layer 22 includes a second front surface 221 and a second back surface 222. The second front surface 221 includes a plurality of second electrode blocks 223. The second electrode blocks 223 are electrically connected to each other and are connected to a plurality of transmission wires 224. The second electrode blocks 223 are disposed against the first electrode blocks 214 and the third electrode block 216. Convex bodies 225 are disposed around the second electrode blocks 223. A gap space is formed between the first electrode blocks 214, the third electrode block 216, and the second electrode blocks 223 with the convex bodies 225.

The backlight layer 3 is disposed under the sensing layer 2. The backlight layer 3 includes a transparent plastic slice with a first surface 31 and a second surface 32. The first surface 31 includes a plurality of first light emission elements 311 against the first sensing blocks 213. A power transmission wire 312 is electrically connected to each of the first light emission elements 311. The second surface 32 includes a plurality of second light emission elements 321 against the first electrode blocks 214 and the second electrode blocks 223. The second light emission elements 321 are electrically connected to each other and are connected to power transmission wires 322. The first light emission element 311 is a light emitting diode (LED). The second light emission element 321 is an electro Luminescent plate. The bottom layer 4 bears the assemblies of the panel 1, the sensing layer 2, and the backlight layer 3.

The first sensing blocks 213 and the second sensing block 215 mentioned above are capacitive touchpad components. A resistance sensing component is formed from the first electrode blocks 214 and the third electrode block 216 against the second electrode blocks 223.

Figure 6:
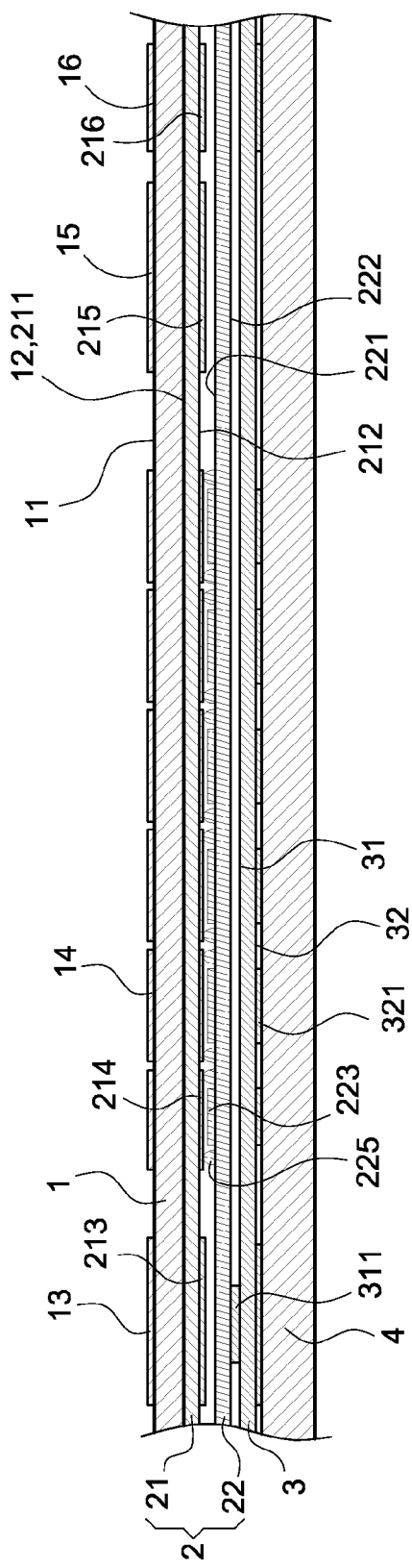
FIG. 6 shows a side cross-sectional view of FIG. 1.
Figure 7:
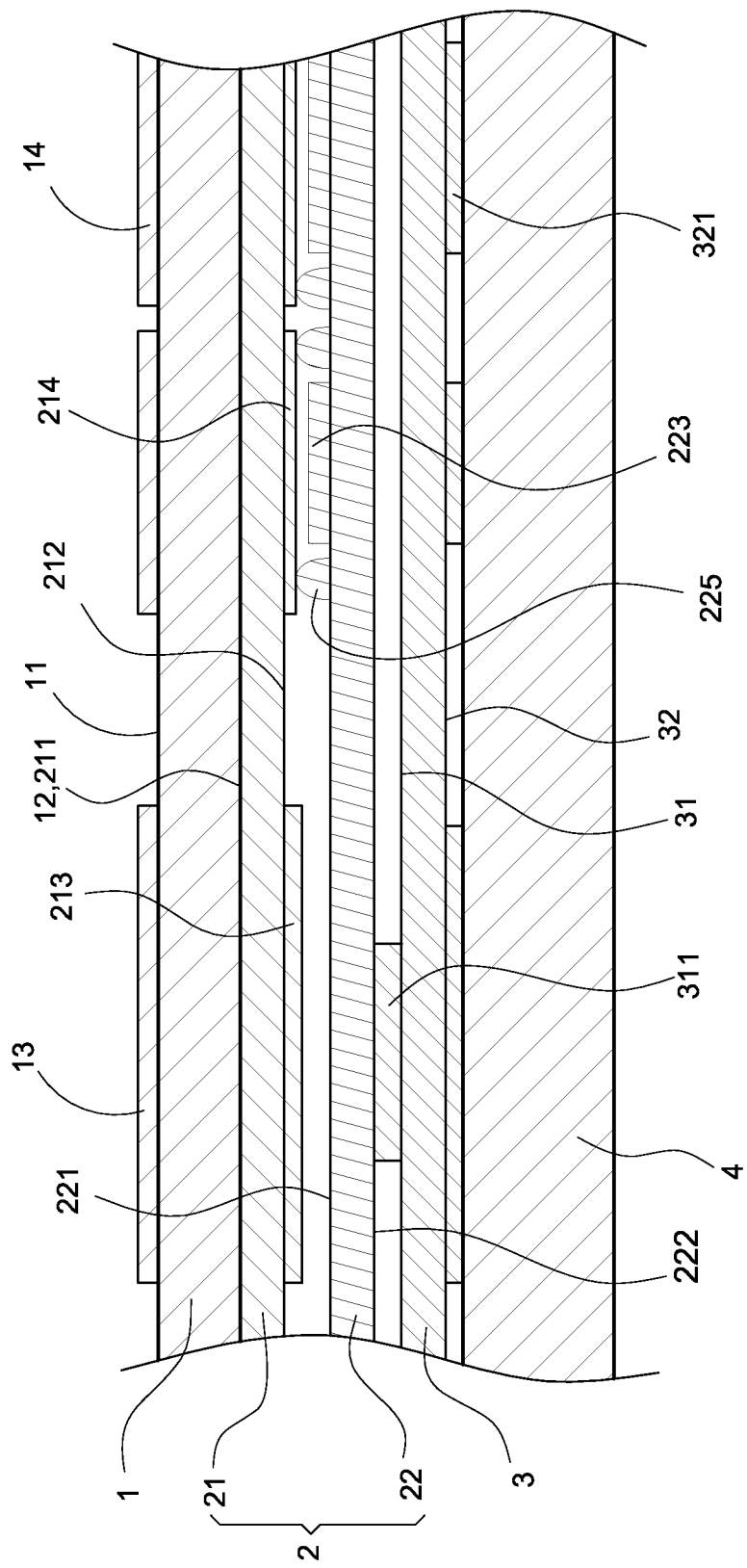
FIG. 7 shows a partially enlarged view of FIG. 6.

FIG. 6 shows a side cross-sectional view of FIG. 1. FIG. 7 shows a partially enlarged view of FIG. 6. As shown in these drawings, a signal sensed by the first sensing block 213 is transmitted out to fast execute the function of the hot key when the hot key pattern 13 is touched by a use's fingers to execute input operating commands.

A signal is transmitted out through the transmission wire 214a and the transmission wire 224 to execute various symbols, letters, numbers, typeface capital letter or lowercase letter, and functions switch and so on when the first electrode block 214 is touched with the second electrode block 223 by a use's fingers pressing any pressed key of the typing key group pattern 14.

A signal is transmitted to a computer host (not shown in the drawing) to control the movement of the mouse cursor when the slides on the cursor control pattern 15 sliding by a user's fingers sensed by the second sensing block 215. A specific function of an icon is executed when the mouse cursor is stopped at the icon and the third electrode block 216 is pressed and touched the second electrode block 223 by a use's fingers.

Figure 8:
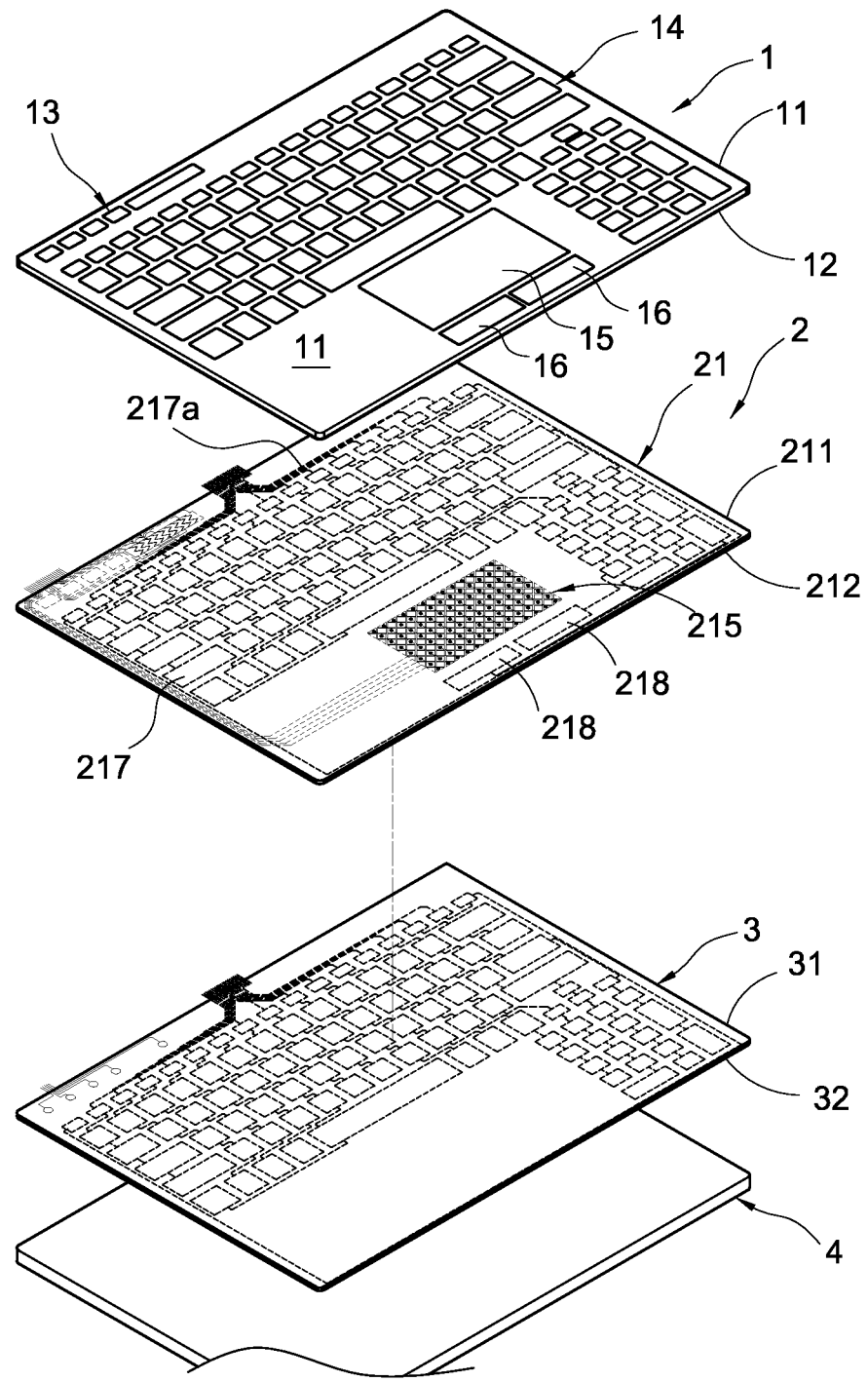
FIG. 8 shows an exploded diagram of another embodiment of the present invention.
Figure 9:
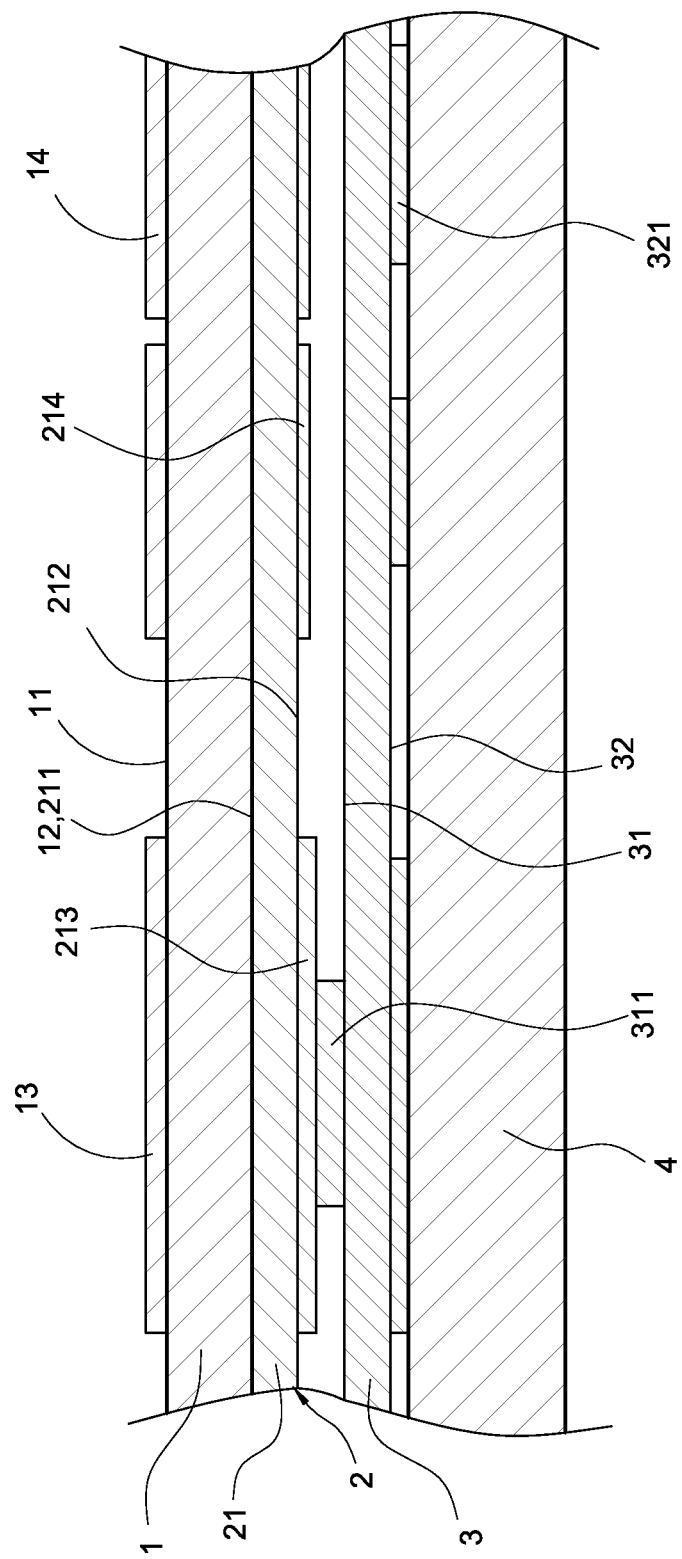
FIG. 9 shows a side cross-sectional diagram of FIG. 8.

FIG. 8 shows an exploded diagram of another embodiment of the present invention. FIG. 9 shows a side cross-sectional diagram of FIG. 8. As shown in these drawings, the first back surface 212 of the first transparent layer 21 has a plurality of third sensing blocks 217 and fourth sensing blocks 218 instead of the first electrode blocks 214, third electrode block 216, and the second electrode blocks 223. The third sensing blocks 217 are electrically connected to each other. The third sensing blocks 217 and the fourth sensing blocks 218 are deposited against the typing key group pattern 14 and the response key pattern 16, and are electrically connected to a plurality of transmission wires 217a. The manufacturing time, process and cost of the second transparent layer 22 is reduced for capacitance type.

Although the present invention has been described with reference to the preferred embodiment thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:
1. An integrated input apparatus including:
a panel including a plurality of hot key patterns, a typing key group pattern, a cursor control pattern, and a response key pattern, wherein the panel is a transparent plastic slice, and the response key pattern includes a mouse left key and a mouse right key;
a sensing layer including a first transparent layer and a second transparent layer, the first transparent layer including a first front surface and a first back surface, the first back surface including a plurality of first sensing blocks, a plurality of first electrode blocks, a second sensing block, and a third electrode block, the first sensing blocks being disposed against the hot key patterns, the first electrode blocks being disposed against the typing key group pattern, the second sensing block being disposed against the cursor control pattern, the third electrode block being disposed against the response key pattern, wherein the sensing layer includes two transparent plastic slices, and the first electrode blocks are electrically connected to each other and are connected to a plurality of transmission wires,
wherein the second transparent layer includes a second front surface and a second back surface, the second front surface including a plurality of second electrode blocks disposed against the first electrode blocks and the third electrode block, convex bodies being disposed around the second electrode blocks to form a gap space between the first electrode blocks and the second electrode blocks, and between the third electrode block and the second electrode blocks, such that the first electrode blocks and the second electrode blocks, and the third electrode block and the second electrode blocks provide resistive input;

wherein the second electrode blocks are electrically connected to another plurality of transmission wires, and the second electrode blocks are not disposed against the first sensing blocks and the second sensing block such that the first sensing blocks and the second sensing block provide capacitive touch input; and a backlight layer disposed under the panel, the backlight layer including a transparent plastic slice with a first surface and a second surface, the first surface including a plurality of first light emission elements against the first sensing blocks, a power transmission wire being electrically connected to each of the first light emission elements, the second surface including a plurality of second light emission elements against the first electrode blocks and the second electrode blocks, the second light emission elements being electrically connected to each other and being connected to power transmission wires.

2. The integrated input apparatus in claim 1, wherein the third electrode blocks are electrically connected to the first electrode block.

3. The integrated input apparatus in claim 1, wherein the first light emission element is a light emitting diode.

4. The integrated input apparatus in claim 1, wherein the second light emission element is an electro Luminescent plate.

5. The integrated input apparatus in claim 1, further including a bottom layer bearing the assemblies of the panel, the sensing layer, and the backlight layer.

6. An integrated input apparatus including:
a panel including a plurality of hot key patterns, a typing key group pattern, a cursor control pattern, and a response key pattern;
a sensing layer including a transparent layer, the transparent layer including a first front surface and a first back surface, the first back surface including a plurality of first sensing blocks, a plurality of third sensing blocks, a second sensing block, and a fourth sensing block, the first sensing blocks being disposed against the hot key patterns, the third sensing blocks being disposed against the typing key group pattern, the second sensing block being disposed against the cursor control pattern, the fourth sensing block being disposed against the response key pattern; and
a backlight layer disposed under the panel, the backlight layer including a transparent plastic slice with a first surface and a second surface, the first surface including a plurality of first light emission elements against the first sensing blocks, a power transmission wire being electrically connected to each of the first light emission elements, the second surface including a plurality of second light emission elements against the third sensing blocks, the second light emission elements being electrically connected to each other and being connected to power transmission wires.

7. The integrated input apparatus in claim 6, wherein the panel is a transparent plastic slice.

8. The integrated input apparatus in claim 7, wherein the first sensing blocks are electrically connected to a plurality of transmission wires.

9. The integrated input apparatus in claim 8, wherein the third sensing blocks are electrically connected to each other and are connected to a plurality of transmission wires.

10. The integrated input apparatus in claim 9, wherein the response key pattern includes a mouse left key and a mouse right key.

11. The integrated input apparatus in claim 10, wherein the fourth sensing block is electrically connected to the third sensing blocks.

12. The integrated input apparatus in claim 6, wherein the first light emission element is a light emitting diode.

13. The integrated input apparatus in claim 6, wherein the second light emission element is an electro Luminescent plate.

14. The integrated input apparatus in claim 6, further including a bottom layer bearing the assemblies of the panel, the sensing layer, and the backlight layer.

* * * * *